US009417955B2

(12) United States Patent
Patterson, III et al.

(10) Patent No.: US 9,417,955 B2
(45) Date of Patent: Aug. 16, 2016

(54) DATA RECONSTRUCTION IN DISTRIBUTED DATA STORAGE SYSTEM WITH KEY-BASED ADDRESSING

(71) Applicant: Datrium, Inc., Los Altos, CA (US)

(72) Inventors: R. Hugo Patterson, III, Los Altos, CA (US); Zhe Wang, Cupertino, CA (US); Mark L. Huang, Seattle, WA (US)

(73) Assignee: DATRIUM, INC., Sunnyvale, CA (US)

( * ) Notice: Subject to any disclaimer, the term of this patent is extended or adjusted under 35 U.S.C. 154(b) by 50 days.

(21) Appl. No.: 14/520,610

(22) Filed: Oct. 22, 2014

(65) Prior Publication Data

US 2016/0055054 A1 Feb. 25, 2016

Related U.S. Application Data

(63) Continuation-in-part of application No. 14/464,733, filed on Aug. 21, 2014.

(51) Int. Cl.
*G06F 11/10* (2006.01)
*G06F 3/06* (2006.01)

(52) U.S. Cl.
CPC ............ *G06F 11/1008* (2013.01); *G06F 3/064* (2013.01); *G06F 3/0619* (2013.01); *G06F 3/0688* (2013.01)

(58) Field of Classification Search
CPC .................................................. G06F 11/1008
USPC ............................................ 714/766, 11, 6.1
See application file for complete search history.

(56) References Cited

U.S. PATENT DOCUMENTS

| 6,704,730 | B2 | | 3/2004 | Moulton et al. |
| 7,373,464 | B2 | | 5/2008 | Zhu et al. |
| 7,434,015 | B2 | | 10/2008 | Zhu et al. |
| 7,840,969 | B2 | * | 11/2010 | Comer .................... G06F 9/485 358/1.13 |
| 8,793,531 | B2 | * | 7/2014 | George ............ G06F 17/30519 714/11 |
| 8,943,357 | B2 | * | 1/2015 | Atzmony ....................... 714/6.1 |
| 2011/0202792 | A1 | * | 8/2011 | Atzmony ............ G06F 11/1076 714/6.24 |

OTHER PUBLICATIONS

Edward K. Lee, et al., "Petal: Distributed Virtual Disks", Proceedings of the 7th International Conference on Architectural Support for Programming Languages and Operating Systems, Assocation for Computing Machinery, 1996, also SIGOPS Oper. Syst. Rev. 30, 5 (Sep. 1996), 84-92, downloaded Jun. 9, 2015 from http://www.thekkath.org/documents/petal.pdf.
Chandramohan A. Thekkath, et al., "Frangipani: A Scalable Distributed File System", SIGOPS Oper. Syst. Rev. 31, 5 (Oct. 1997), 224-237, downloaded Jun. 9, 2015 from http://pdos.csail.mit.edu/6.824-2004/papers/thekkath-frangipani.pdf.

(Continued)

*Primary Examiner* — Fritz Alphonse
(74) *Attorney, Agent, or Firm* — Jeffrey Pearce

(57) ABSTRACT

In a Distributed Virtual Array data storage system, data chunks making up data containers are stored in a key order in storage devices according to layouts specified in a layout data structure. When any of the storage devices becomes inaccessible, the storage devices iteratively return, in storage order, their stored chunks. Chunks belonging to the same container are identified and, if that container had a chunk in the inaccessible storage device, are used to reconstruct the inaccessible chunk. The chunks of the container are then stored according to an updated layout. The keys are independent of physical storage locations.

32 Claims, 8 Drawing Sheets

(56) References Cited

OTHER PUBLICATIONS

Brent Welch, et al., "Scalable Performance of the Panasas Parallel File System" 6th USENIX Conference on File and Storage Technologies (FAST '08), San Jose, California, Feb. 26-29, 2008, Jun. 23, 2011 Whitepaper version downloaded May 2015 from http://www.panasas.com/sites/default/files/docs/Panasas_Scalable_Storage_Arch_WP_1066.pdf.

Author unknown, "The Seagate Kinetic Open Storage Vision", web page description downloaded Jun. 10, 2015 from http://www.seagate.com/tech-insights/kinetic-vision-how-seagate-new-developer-tools-meets-the-needs-of-cloud-storage-platforms-master-ti/.

Frank Denneman, "Understanding the I/O Path of a Storage Acceleration Solution", PernixData online whitepaper downloaded Jun. 10, 2015 from http://pernixdata.com/sites/default/files/resources/Understanding_IO_Path_of_Storage_Acceleration_Whitepaper.pdf.

Author unknown, "Nutanix Complete Cluster", Nutanix online whitepaper downloaded Jun. 10, 2015 from http://go.nutanix.com/rs/nutanix/images/WP_Nutanix_Complete_Cluster_Technical_Whitepaper.pdf.

Author unknown, "What's New: VMware Virtual SAN 6.0", VMware Storage Business Unit Documentation v1.0, Feb. 2015, VMware online whitepaper downloaded Jun. 10, 2015 from http://www.vmware.com/files/pdf/products/vsan/VMware_Virtual_SAN_Whats_New.pdf.

Mayur Dewaikar, "Symantec NetBackup PureDisk Optimizing Backups with Deduplication for Remote Offices, Data Center and Virtual Machines", 2009, Symantec online whitepaper downloaded Jun. 10, 2015 from http://eval.symantec.com/mktginfo/enterprise/white_papers/b-symantec_netbackup_puredisk_WP.en-us.pdf.

Alberto Miranda, et al., "Reliable and Randomized Data Distribution Strategies for Large Scale Storage Systems", HIPC '11 Proceedings of the 2011 18th International Conference on High Performance Computing, pp. 1-10, IEEE Computer Society, 2011, downloaded Jun. 13, 2015 from http://www.ssrc.ucsc.edu/Papers/miranda-hipc11.pdf.

* cited by examiner

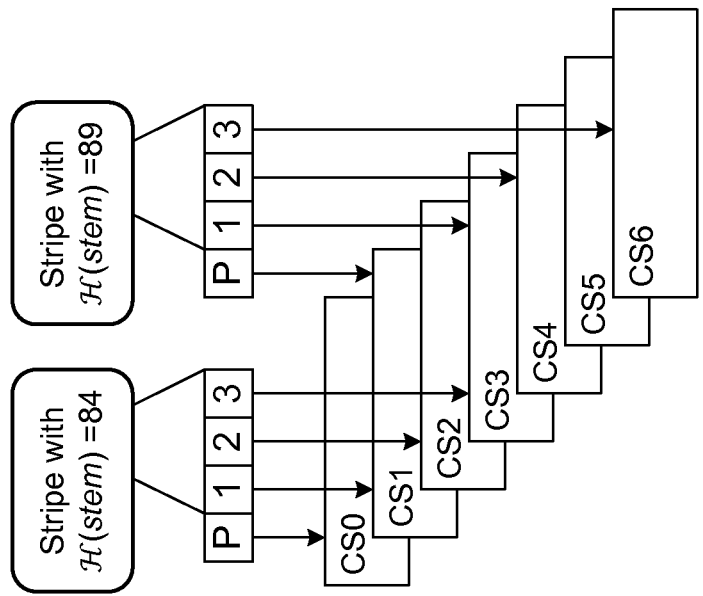

FIG. 5B

Chunk Stores

| Map ID | CS0 | CS1 | CS2 | CS3 | CS4 | CS5 | CS6 |
|---|---|---|---|---|---|---|---|
| 0 |  | ✗ | 2 | 3 | 1 |  |  |
| 1 | P |  | 1 |  | 2 | 3 | 3 |
| 2 | P |  | 1 |  | 2 |  | 3 |
| 3 | P |  |  | 1 |  | 2 | 3 |
| 4 |  |  | 1 | P | 2 | 2 | 3 |
| 5 |  |  | P | 1 | 2 | 2 |  |
| 6 |  |  | P | 1 | 2 | 3 |  |
| 7 | 3 |  | 1 | 2 | P |  |  |
| ⋮ | ⋮ | ⋮ | ⋮ | ⋮ | ⋮ | ⋮ | ⋮ |
| 27 |  |  | 1 | 2 | 3 | P |  |

Chunk Stores

| Map ID | CS0 | CS1 | CS2 | CS3 | CS4 | CS5 | CS6 |
|---|---|---|---|---|---|---|---|
| 0 |  | ✗ | 2 | 3 | 1 |  |  |
| 1 | P |  | 1 | 3 | 2 | 3 | 3 |
| 2 | P |  | 1 |  | 2 |  | 3 |
| 3 | P |  |  | 1 |  | 2 | 3 |
| 4 |  |  | 1 | P | 2 | 2 | 3 |
| 5 |  |  | P | 1 | 2 | 2 |  |
| 6 |  |  | P | 1 | 2 | 3 |  |
| 7 | 3 |  | 1 | 2 | P |  |  |
| ⋮ | ⋮ | ⋮ | ⋮ | ⋮ | ⋮ | ⋮ | ⋮ |
| 27 |  |  | 1 | 2 | 3 | P |  |

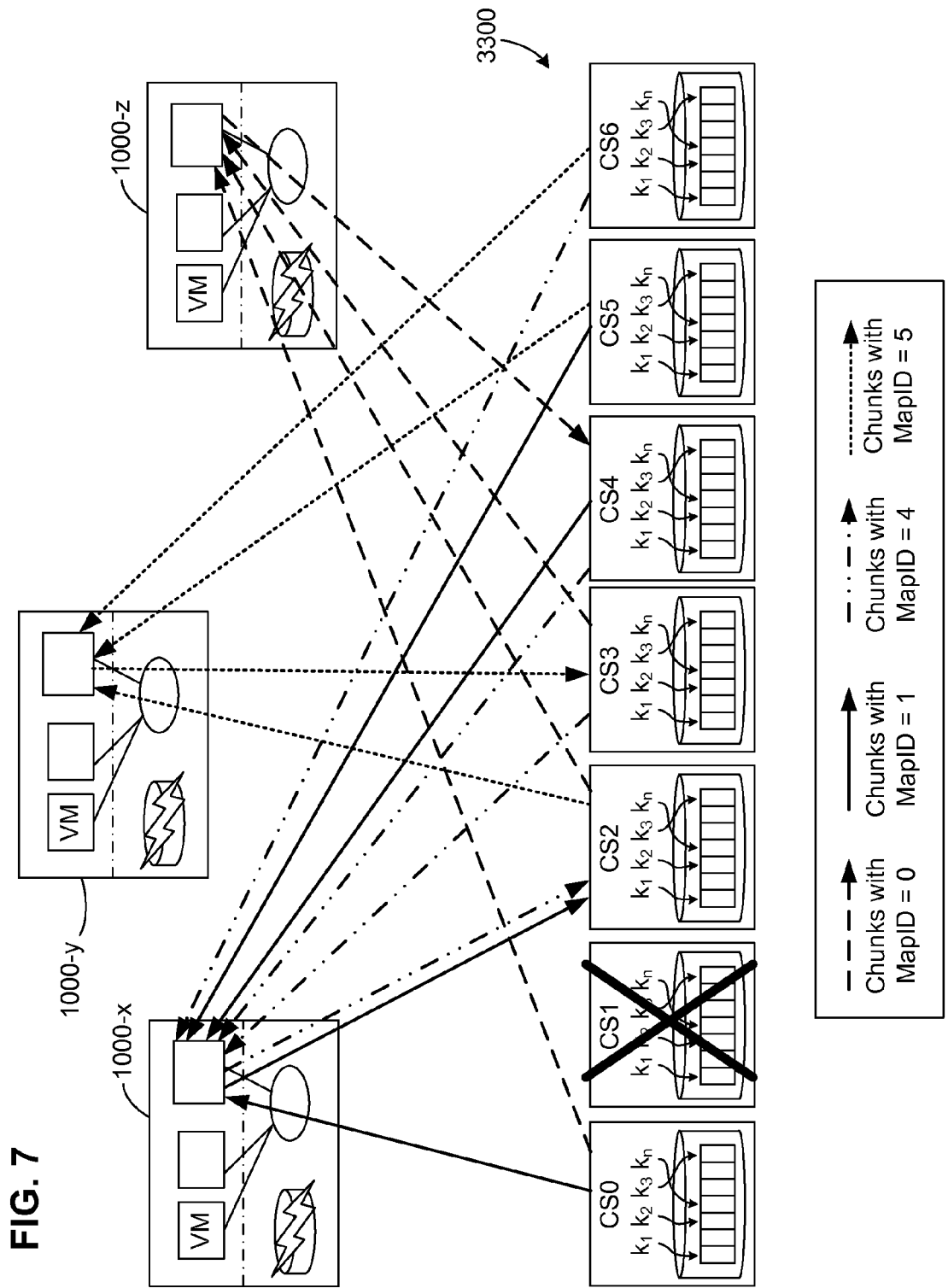

DATA RECONSTRUCTION IN DISTRIBUTED DATA STORAGE SYSTEM WITH KEY-BASED ADDRESSING

CROSS-REFERENCE TO RELATED APPLICATIONS

This application is a continuation-in-part of U.S. patent application Ser. No. 14/464,733, filed 21 Aug. 2014.

FIELD OF THE INVENTION

This invention relates to data storage, in which data sets are stored as separately accessible portions.

BACKGROUND

Issues of data storage arise almost everywhere in the modern world, especially as the need for ever more storage increases. Some of the typical goals for a data storage system include availability, reliability, capacity and performance. Of course, these goals often conflict.

The situation has become even more complicated with the advent of various forms of distributed storage, in which not only data sets (defined in the broadest sense as any related collection of digital information, including both executable and non-executable data) as a whole but even different portions of single data sets may be stored on different devices. Indeed, even unsophisticated users nowadays interact with storage systems in the "cloud", such that they may have no idea on which continent(s), much less on which server(s) or disk(s), their data resides. In such an environment of distributed storage, two other challenges faced by enterprise IT managers are the need to reduce IT costs and the desire to increase flexibility and nimbleness.

One way to better achieve these goals is to change the nature of the data centers. In the past, enterprise data centers consisted mainly of a melange of dedicated servers connected to a collection of storage area network (SAN)-attached storage arrays. Deployment of a new application thereby involved purchasing a new server, provisioning a logical unit number (LUN) on the array and installing the application. More recently, however, system designers have been leveraging new technologies, such as machine virtualization.

Virtualization is now found at almost every layer of a system stack, from virtualization of an entire "computer" in the form of a virtual machine (VM) to virtualization of individual components. The virtualization technique of course extends to data storage as well.

One well-known method for data storage virtualization is Redundant Array of Independent Disk (RAID) technology, in which, as the name implies, data is stored in a distributed manner, in more than one storage device. The several standard RAID "levels" represent different choices in the trade-offs between the different storage goals. In systems configured according to certain of the RAID levels, data sets are divided into blocks which are grouped into larger "stripe units" which are stored on different disks. Furthermore, in most RAID levels, by either writing redundant copies ("mirroring") of the stripe units, or including at least some form of error correction, such as one or more stripe units consisting of parity bits, data that is lost, for example, by failure of a disk, can be reconstructed and thereby recovered.

In a typical real-world implementation, hundreds if not thousands of clients, that is, software or hardware entities may want to write a large number of data sets and blocks—even into the billions—to many storage devices within potentially many disk arrays. This leads to inevitable and sometimes daunting bookkeeping challenges, especially when different entities may need to read the same data. For example, if the data set of one entity is written over, say, ten different disks, and one of the disks physically fails, then there must be some way for not only the original, writing entity but also all other entities that may need to read it to find the "missing" data on whatever other server/array/disk each stripe was either mirrored or reconstructed on. One way to meet these challenges is to implement at least one degree of address indirection, with appropriate mapping tables that the system software layer establishes and maintains. There is an ever-present need to improve the ability of such systems with respect to flexibility, ease of administration and/or efficiency of reconstruction of missing data, among other improvement challenges.

BRIEF DESCRIPTION OF THE DRAWINGS

FIGS. 4A and 4B show an example of a stripe layout table and how the chunks in each stripe are assigned to storage units.

FIGS. 5A-5C illustrate failure of a storage unit and how the layout table may be changed to accommodate this.

FIG. 7 illustrates how multiple hosts may contribute to concurrent reconstruction of chunks belonging to stripes with multiple Map IDs referenced in the layout table.

DETAILED DESCRIPTION

Various embodiments and aspects are referred to collectively here as a Distributed Virtual Array (DVA) merely for the sake of convenience and succinctness. As is explained further below, certain of the aspects of the primarily described embodiment are inventive in their own right and can be used to advantage even without other DVA features. Purely by way of example, the DVA is illustrated and described primarily with reference to a system in which the entities that read and write data to the distributed storage system are mainly virtual machines (VMs) running as guests on one or more host platforms. As will be understood, however, the DVA can accommodate reads and writes of data by any type—or indeed mixed types—of entities, virtualized or not.

General DVA System

Figure 1:
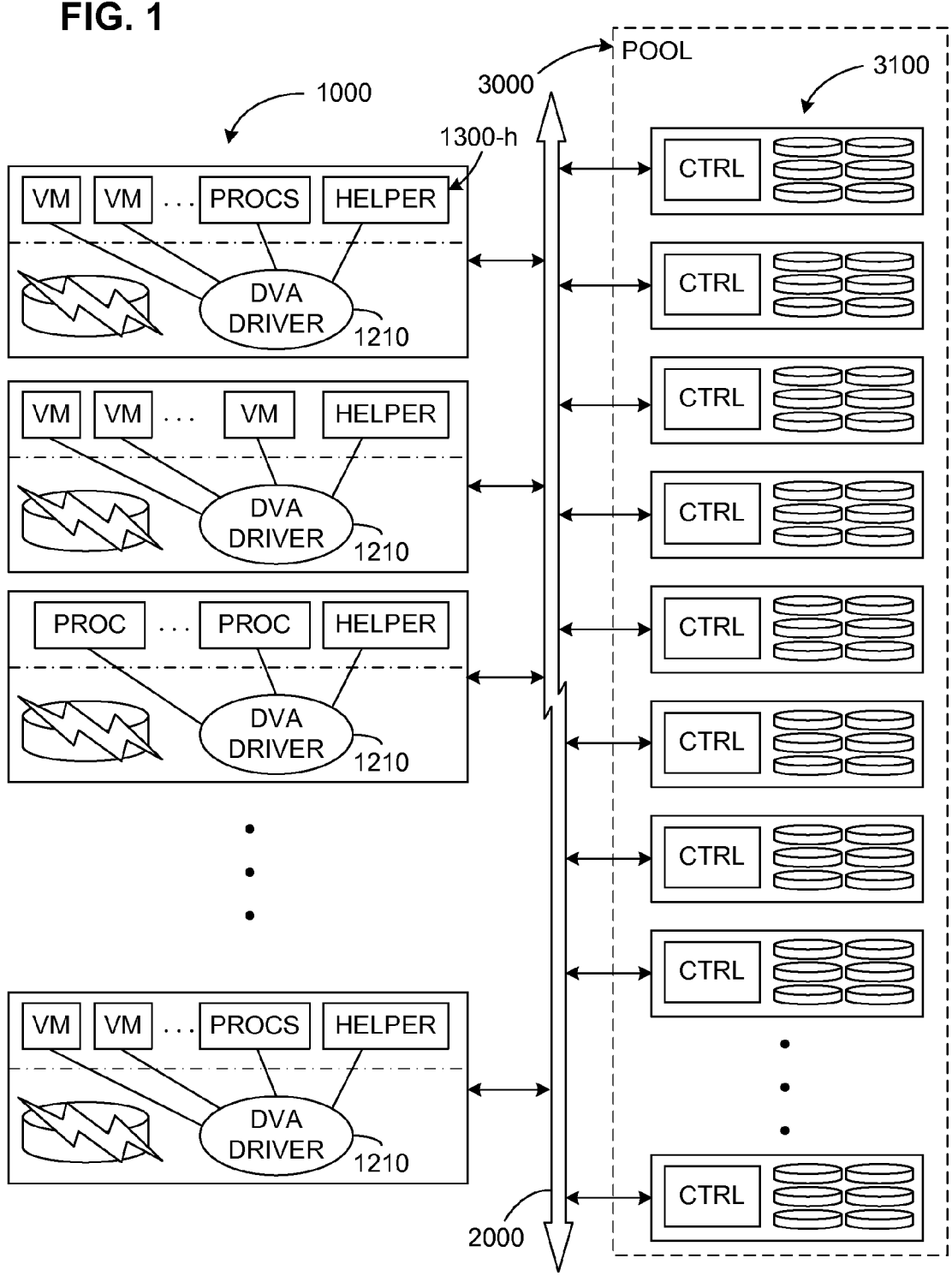
FIG. 1 illustrates hosts interacting via a network with a storage pool comprising several storage devices.

FIG. 1 shows, at a high level, the relationship between two main physical "sides" of the DVA: any number (including one) hosts 1000 and a Storage Pool 3000, which includes storage nodes 3100, which from the perspective of the hosts, may form a single yet distributed storage system. Entities within the hosts 1000 write data that is ultimately stored in the physical storage devices located within the Storage Pool 3000. As mentioned, the entities may be of any type, including virtual machines (shown as "VM" s) or more general, non-virtualized processes (shown as "PROCS"). FIG. 1 thus illustrates hosts that have mixed writing entities (VMs as well as other processes), a host whose entities are all VMs, and another host whose writing entities are all non-virtualized processes, which may be at either the user or system level.

In some embodiments it will also be advantageous to include within each host a "helper" process 1300-*h*, which may also be a non-virtualized software module, or be implemented as another one of the VMs. The helper process 1300-*h* carries out such background storage tasks as disk reconstruction, scrubbing, garbage collection, etc. The various parts of the overall system shown in FIG. 1 are discussed in more depth below. The nature of reconstruction is also explained in greater detail below, but even at this point one should note that enabling disk reconstruction from within data-writing hosts is itself unique.

FIG. 1 also illustrates, at a high level, some other features that are explained in greater detail below. In particular, note that the hosts 1000 may access the storage nodes 3100 directly over at least one network 2000, with no need to go through a central file server or storage array controller.

Figure 2:
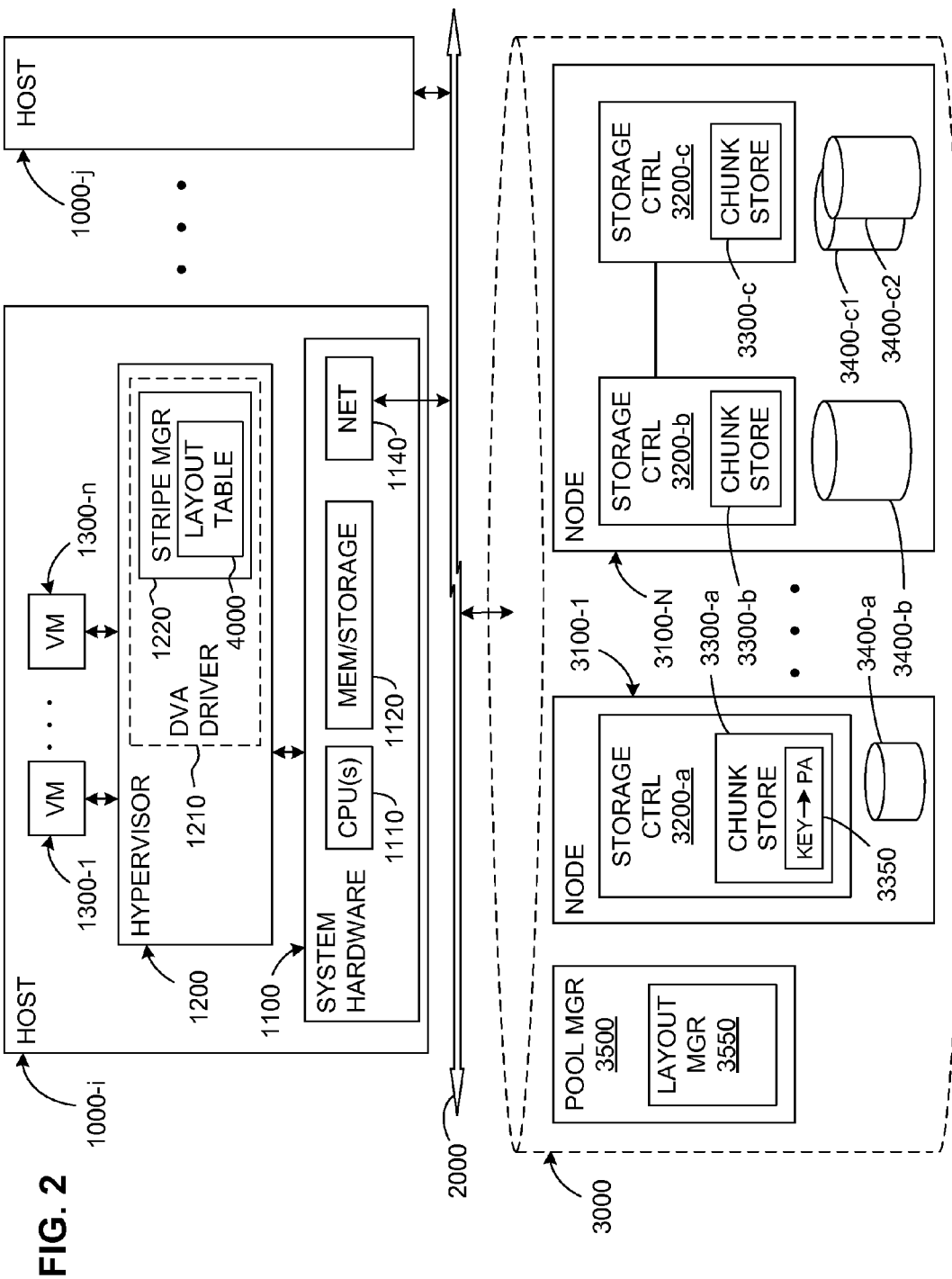
FIG. 2 shows the main system components of embodiments of a Distributed Virtual Array.

FIG. 2 illustrates the main functional components of one example of the DVA infrastructure: Each of one or more host platforms, which may be servers 1000-*i*, . . . , 1000-*j*, includes system hardware 1100, including one or more processors (CPU's) 1110, and some device(s) 1120 for non-persistent, volatile and/or persistent, non-volatile, non-transitory storage. The line between what is a "storage device" and "memory" is no longer as bright as it once was, however, and the embodiments described here do not presuppose such a distinction. For example, many modern servers use various solid-state storage devices (SSDs) such as "server flash" to increase throughput and speed, which is commonly measured in terms of IOPS (Input/Output Operations Per Second), especially for non-contiguous storage locations. No specific type of host-side storage technology is required to implement the embodiments described here, and it is not necessary for every host to employ the same storage technology.

The hardware 1100 will also include other conventional mechanisms such as a network connection device 1140 for transfer of data between the various components of the system and the network(s) 2000, which may be any known public or proprietary local or wide-area network such as the Internet, an internal enterprise network, etc. Note that, depending on the implementation, different hosts may communicate with the DVA system over different networks, thereby allowing DVA operations in parallel. The only requirement is that, whatever network(s) is/are used, all clients are able to access the storage nodes (see below) they need to access. "The" network 2000 is therefore to be read as the collection of whichever networks are implemented, along with any necessary switching or other communications devices if data needs to pass between different networks.

Each host will also include conventional system software such as, depending on the implementation, an operating system (OS), device drivers, etc. As FIG. 2 illustrates, if a host such as 1000-*i* supports a virtualization platform, it will typically include some form of hypervisor 1200, which forms the interface layer between the system hardware 1100 and (in the illustrated embodiment) at least one virtual machine (VM) 1300-1, . . . , 1300-*n*. As is well known, VM is a software abstraction of an actual physical computer system. The VMs are shown FIG. 2 within the host merely for simplicity—in most implementations, a virtual machine is a "guest" that is running on the hypervisor/hardware host. In some virtualized systems, a "virtual machine monitor" is included as an interface to underlying software layers, such as the hypervisor or a host OS. Many hypervisors, such as the ESX Server family of products of VMware, Inc., run directly on "bare metal", that is, directly on the system hardware 1100, with no need for interaction with a host OS. In other virtualization platforms, the hypervisor may run on or at the same level as the host OS, which supports and performs some operations upon calls from the hypervisor.

The various embodiments of the invention described here are not dependent on any particular virtualization architecture, whether for the VMs, the hypervisor(s) or other virtualization layers. Indeed, VMs are not required at all, as FIG. 1 illustrates.

Similarly, the invention does not presuppose the 1200 hypervisor, but rather only some system software layer that processes data storage read/write requests from software and hardware entities ("clients"). A "host" is thus any platform on which processes (of which VMs are a special case) run that may wish to write data to and/or read data from the distributed storage arrangement described below.

Regardless of the configuration of hosts, each host system software layer preferably includes a host DVA driver 1210, which is implemented as a body of processor-executable code that is stored in non-transitory storage and is loaded into memory for execution by the host CPU(s) 1110. The driver may run within the hypervisor, as shown, or within the host OS, within a process, within a VM, or any other appropriate context. The DVA driver is responsible for communicating read/requests to the rest of the DVA system, ensuring proper formatting and identification of data sets to be transmitted, and maintaining the data structures that are included at the host side of the DVA system. These procedures and structures are described further below.

The host server(s) 1000, . . . , 1000-*i* are connected via the network(s) to the Storage Pool 3000, which comprises a number of storage nodes 3100-1, . . . , 3100-N. The Storage Pool 3000 is shown using dashed lines to indicate that it will typically be a logical boundary, such that the various nodes may and often will be different physical servers. The logical, conceptual boundary of the Storage Pool may also include processes and extend beyond the set of physical storage nodes 3100-1, . . . , 3100-N. For example, the DVA Driver 1210 may also include software modules that carry out some of the procedures, described below, that manage how data is written, read, and reconstructed in the nodes. The DVA Driver 1210 is thus also illustrated in FIG. 2 with a dashed line.

Two of the many currently available examples of possible choices to implement a storage node could be a Xyratex chassis with multiple disk controllers, or a single-disk "FAWN" (Fast Array of Wimpy Nodes), which is a low-power server architecture for intensive input/output tasks. More generally, the nodes can be implemented using any form of computer that communicates with at least one disk over any form of bus or network connection. Indeed, a node could itself even be an entity that writes data to the Storage Pool, such that a single system could include both the DVA driver 1210 and the software modules illustrated within nodes 3100-1, . . . , 3100-N. Each node contains one or more storage controllers 3200-*a*, . . . , 3200-*b*, 3200-*c*, each of which comprises conventional processing circuitry to control one or more disks, flash or other SSD devices or other persistent storage devices 3400-*a*, 3400-*b*, . . . , 3400-*c*1, 3400-*c*2.

In the illustrated embodiment, the storage controllers include software modules referred to here (for reasons that will become clear below) as "Chunk Stores" (CS) 3300-*a*, 3300-*b*, . . . , 3300-*c*, which participate in managing the disks. For the sake of simplicity and to avoid needless repetition, the various host(s), storage nodes, and storage controllers, Chunk Stores, and disks within the Storage Pool 3000 are referred to below using collective numbers 1000, 3100, 3200, 3300, and 3400, respectively.

The Storage Pool Interface: Containers and Container Sets

Not being a file server or block array, the Storage Pool 3000 does not need to export a file system or logical unit numbers (LUN), and storage clients do not need to access data through files, streams, or conventional numerical block addresses. A conventional block device has a fixed number N of blocks, which are addressed by number: 1 . . . N; blocks are not allocated or deallocated from the device dynamically.

In contrast, the Storage Pool 3000 exports "container sets", which are dynamically-sized collections of related, named "containers". As used here, a "container" is any body of digital data that a writing entity wishes to be stored as a plurality of associated, constituent sub-sets, referred to herein and described below as "chunks".

Clients allocate new containers, to a container set by writing a container with a new unique name or key that either the client assigns or that the system generates on behalf of the client. To read back a container, clients give the Storage Pool the name or key for the container they want to read. When the container is no longer needed, clients can deallocate the container, which shrinks the aggregate size of the container set and releases the storage capacity for the container back into the pool so that it can be allocated to some other new container in the same or a different container set.

Containers are preferably uniquely named, immutable sets of data with all or at least most of the following properties:

- Uniquely named—A container has a name that uniquely identifies it among all the containers in the container set. By giving all containers unique names, there is no ambiguity about which piece of data is being requested. There are different options for accomplishing this property. One option is to allow writing entities to assign whatever names they want as long as the name includes a writer-unique portion. Other alternatives are of course possible to create unique identifiers.
- Fixed size—Each container preferably has a fixed data capacity. If less data needs to be written, it may be padded out to the fixed size. (It is possible to have a pool with variable sized containers, but it complicates some of the operations described below.)
- Immutable—Once written, a container preferably cannot be modified, its name cannot be changed, its size cannot change, and its data cannot be overwritten or otherwise modified. It would, however, be possible to relax this preferred requirement at the cost of the increased administrative burden that would be needed to coordinate overwrites.
- Can be deleted—Clients can delete containers. Once deleted, clients can store a new container with the same name and different (or the same) data. Deleting a container frees its capacity back to the Storage Pool.
- Readable—Containers can be randomly read given a container name, an offset within the container from which to start reading, and a length.
- Shared.—Containers are shared objects that are visible to, and can be accessed by, any client of the Storage Pool.

The Storage Pool typically hosts and exports many container sets, which collectively share the Storage Pool's capacity. Container sets preferably have the following properties:

- Uniquely named—A container set has a name that uniquely identifies it among all the container sets in the Storage Pool. A container set should not be renamed.
- Mutually exclusive—Container sets are mutually exclusive; containers belong to a single container set.
- Dynamically sized—A container set will not generally need to have a set size. Rather, the size of a container set is the number of containers it contains and the capacity it consumes is the total capacity consumed by the containers. A container set may therefore have a quota assigned to it that limits its maximum size, but one should note that this is different than having a fixed size. The practical limit on the size of a container set will be determined by the amount of storage space available.
- Iterable—In the preferred embodiments, a container set does not require any natural ordering. Moreover, the containers it includes need not be contiguous. In general, these embodiments require no assumptions about where and on which particular device(s) a given container is actually stored. However, as will be understood from the discussion below, the containers that a container set contains may be listed in order by name, with optional filtering through pattern matching.
- Can be deleted—When a container set is deleted, all of the containers it includes are also deleted. Once deleted, all of the capacity consumed by its containers may be freed back to the Storage Pool.
- Resilient—In the preferred embodiments, the Storage Pool stores containers with sufficient redundancy that if an individual hardware component fails, data stored by that component can be reconstructed from the data on the surviving components.

Stripes and Chunks

To help achieve most or all of these properties, the Storage Pool stores containers as stripes. Disk striping in general is a well-known storage concept. Conventionally, disk striping entails dividing a set of data into stripe units and then spreading the stripe units across several persistent storage devices. Disk striping may be implemented with or without error correction, for example, in the form of parity. Parity information is typically encoded into a separate stripe unit within the stripe and stored on a device other than the one(s) holding the data stripe units that may be lost and need to be reconstructed.

The different embodiments of this invention create stripes and assign the stripe units, here called "chunks", to storage devices according to a unique and uniquely advantageous protocol. This protocol may include a combination of the container data and additional, redundant, error-correction data that enables the pool to reconstruct lost data in the event of a hardware failure. The Storage Pool organizes the containers into several chunks, computes error-correction codes across these chunks, stores these computed codes in additional chunks, here called "ECC chunks", and stores all these chunks as a stripe in the pool.

In many cases, a writing entity will present the data to be included in a container to the Storage Pool as a single body, which the Storage Pool then breaks into the chunks. In other cases, the writing entity may present already-separated, chunk-sized data—related or not—to the Storage Pool, which then "synthesizes" a corresponding container from these "pre-made" chunks; in this case, the container is just an indication of the association of the chunks as one set with a name. The pool can then be thought of as storing such sets of data chunks instead of pre-formed containers. Container "synthesis" may even be based on combinations of these alternatives. For example, if a writing entity wishes to store data sets smaller than a chunk as a single container, the Storage Pool could concatenate or otherwise combine these smaller data sets into a single set, and then break it into chunks. A given implementation of embodiments of the invention need not be limited to either option—as long as writing entities indicate which operation is needed, or the Storage Pool infers it from the size of the data sets presented to it for storage, then the Storage Pool can associate chunks as a container, compute one or more ECC chunks, and store the chunks.

As FIG. 2 illustrates, each host preferably includes a Stripe Manager 1220, which is a software component or layer that creates the stripes out of the containers that clients (such as VMs and/or other processes) wish to store. The Stripe Manager preferably stores each of the chunks in a stripe in a different Chunk Store 3300 so that the loss of one storage device affects a minimum of chunks in any individual stripe. Typically, there will be many more Chunk Stores than there are chunks in any one stripe. Although the chunks for one stripe are stored in only a few Chunk Stores, the Stripe Manager preferably distributes the chunks in the many stripes as evenly as possible to all the Chunk Stores to balance load and capacity. The Stripe Manager generally will not need to be aware of what sort of data is stored in the stripes, or of what relationships there may be among the stripes. Moreover, the Stripe Manager also does not need to know anything about the physical location identifiers (such as physical addresses, drive IDs, etc.) at which the stripes will be stored.

The Stripe Manager 1220 preferably also creates error correction (including the "error" of erasure) data for each stripe, which it stores in special ECC chunks it adds to the stripe so that stripes can be reconstructed from remaining chunks when disks 3400 and/or controllers 3200 fail. Depending on the chosen system design, one or more chunks in a stripe may comprise bits of an error-correcting code (ECC), which may be generated according to any known routine, such as erasure coding. The use of a sufficient set of parity bits is one well-known ECC technique that may be used, for example, in the form of one or more ECC chunks included along with the data chunks for each stripe. Note that controller 3200 failures may be treated like the simultaneous failure of all the disks 3400 attached to the respective controller. In some designs, each chunk may include a mixture of ECC bits and container data bits in a way that allows the container data to be recovered from the chunks in the stripe.

As mentioned above, the Storage Pool 4000 conceptually and logically may extend even to include components within hosts, such as the DVA driver 1210, in particular, the Stripe Manager 1220. Division of data into containers (or stripes or other chosen definitions of blocks), and of these containers into chunks, may be performed in any component of the Storage Pool. Even for a given host, it would even be possible to divide data into stripes and chunks in other entities as well, such as in a dedicated VM or a helper process—wherever the corresponding code is located—which then also can be considered to be logically part of the Storage Pool.

Layout Table

Stripe Manager 1220 distributes the chunks for a stripe to Chunk Stores 3300 according to a global stripe map table, also referred to in this disclosure as a "layout table" 4000, which is described and illustrated in detail below. The layout table may be generated, updated, and distributed to stripe managers 1220 by a storage pool manager 3500, which may appear as a special node or run in one of the storage controllers, hosts, or any other suitable location. FIG. 2 illustrates within the pool manager 3500 one or more layout managers 3550.

In addition to ensuring that no two chunks in the same stripe are stored on the same CS, the Stripe Manager preferably is configured to seek to optimize any chosen load distribution metric or combination of metrics. Examples of loads that may be of interest in different implementations include:

Disk Load—the distribution of all chunks across all disks. A uniform Disk Load means that each disk is storing and serving its fair share of chunks such that capacity and IOPS are evenly distributed.

ECC Load—the distribution of ECC chunks across all disks. ECC chunks will not normally be read unless one or more chunks are missing in a stripe. A stripe map could have perfectly even Disk Load in normal operation, but a skewed Disk Load when a disk fails and the ECC blocks are suddenly accessed a lot if the ECC Load were not balanced.

Access Load—the distribution of chunk accesses across all disks. If some chunks of a particular type of stripe are read more often than others (perhaps the first data chunk in the stripe contains a header of some sort), then IOPS may not be evenly distributed.

Reconstruction Load—the distribution of chunks on other disks that a given disk depends on to reconstruct its contents. A uniform Reconstruction Load means that if a disk fails, all remaining disks participate as equally as possible in reconstructing its contents.

Note that it would be possible to distribute chunks over different shelves instead of just different drives.

Chunk Store

Internally, the Storage Pool 3000 comprises a plurality of Storage Nodes 3100. Each Storage Node in turn comprises the persistent storage devices 3400 and corresponding controllers 3200, each of which hosts one or more of the Chunk Stores ("CS") 3300, which manage distinct storage devices ("drives"). Although each CS should preferably manage a separate physical entity (for the sake of fault tolerance), it could also manage an assemblage of physical entities, such as multiple drives on single shelf. To illustrate this, CS 3300-c is shown as managing two drives, 3400-c1 and 3400-c2. Configuring the system such that each CS manages a single corresponding drive, however, simplifies error handling since, otherwise, the failure of a controller or storage node is the same as the simultaneous failure of multiple Chunk Stores, their network connections, or their underlying disks. Note also that it is not necessary for the Chunk Stores to be functionally separate from the drives themselves; rather, any CS could be incorporated into the drives themselves, that is, into the disk's internal controller.

A Chunk Store preferably divides its capacity into the fixed-size chunks, which may be of any chosen, uniform size, but that, in one implementation, were on the order of 1 MB in size. It is possible for the chunks to vary in size, but it is simpler if they are all the same size. The CS allocates chunks to clients upon request. At allocation time, a client provides a key, which serves as the name of the chunk, and preferably writes the entire contents of the chunk at once. Clients use the key to read all or a portion of the chunk, and to deallocate the chunk to free its space. The CS manages its own capacity and determines where on its storage media each chunk will be stored.

There are advantages to a CS not presenting a conventional disk interface: A disk reads and writes sectors addressed by sector number. Such fixed-sector or block addressing in a cluster environment requires coordination among writers so that they do not write to the same address. Such coordination can require tricky, error-prone code and also adds performance overhead. In contrast, a CS manages its own capacity and clients may provide their own unique keys as the addresses for the chunks that they write with a minimum of coordination with other clients.

Keys

Standard RAID increases bulk throughput (because more disks are involved), durability (because of erasure coding), and fault tolerance (because missing data can be reconstructed on the fly from remaining disks). However, most RAID implementations emulate a block device, and coordinating access to the underlying disks to make them appear to be a single addressable entity is non-trivial: Fine-grained locking on a single system is difficult enough, but fine-grained, distributed locking across multiple independent nodes is very complicated and not scalable.

The Storage Pool 3000 avoids this problem because it is not required to emulate a block device—there is no need to hide the backend storage nodes behind a logical block address space because, as is explained further below, the DVA system does not require such semantics at all. Instead, the storage clients select unique names, referred to here as "keys" or Stripe IDs, for the stripes that they write. Thanks to use of these keys, the storage clients do not even need to coordinate amongst themselves; this greatly improves the scalability of the DVA system as compared with known, traditional cluster storage systems. The main job of the Storage Pool is to store the stripes that clients write, and to return them when requested to by key.

Accessing stripes and chunks by key also simplifies the implementation of various distributed operations. For example, concurrent writes from various clients are made possible without the need for locks, reconstruction of objects, assignment of chunks to specific Chunk Stores, RAID reconstruction, garbage collection, index management, etc.

Unlike files in a conventional file system, chunks are preferably immutable and cannot be renamed or modified once written, but rather only deleted. The key space made available to a CS should therefore preferably be chosen to be large and sparse enough for clients to use; Universally Unique Identifiers (UUIDs) are one of many choices for chunk keys. Using UUIDs (also sometimes called "Global Unique Identifiers", in particular, by Microsoft Corp., to identify software objects and other software components) as a basis, that is, as an input parameter to whatever routine is used to generate the keys, has the advantage of being a known standard; however, use of UUIDs is not required. Rather, as long as the system implements some key-generating convention that assures uniqueness at least within the context of the pool, and that all clients follow, then such keys may be used instead. This method relieves the clients from having to agree on either a specific block or block address to allocate, and lets the clients operate substantially independently as they store data in the Chunk Stores. Note that, given a 1 MB chunk size, for example, a 4 TB disk can store up to 4 million chunks, but even if 128 bytes were required to store each key record in the index, a 4 TB Chunk Store would still require only 512 MB of RAM to index.

Although the keys do not need to have any innate structure, the storage clients, that is, the writing entities, should share a common naming convention to avoid collisions. This convention could be as simple as choosing random UUIDs, but it will typically be advantageous to adopt a key convention that describes common properties of the chunks in a stripe. As one example, each key could include a container set ID, an identifier of the writing entity, and a serial number that is unique within the scope of that writer ID. Other key formats are possible so long as each writer creates keys that are guaranteed not to collide with a key generated by another writer. For example, a key could include other identifying parameters, such as some identifier of the host platform the chunk originated from, or a version number for the data set of an object from which a chunk was formed, which would enable the system to search on and find all chunks associated with a given host, version or object.

MapIDs and Layout Table

Ultimately, regardless of how data sets are processed, the purpose of all storage systems is, of course to store them. In systems in which the data sets are striped, and in particular in these novel embodiments in which the stripes comprise multiple chunks, the Stripe Manager must decide which Chunk Store each chunk of each stripe is to be written to.

Figure 3:
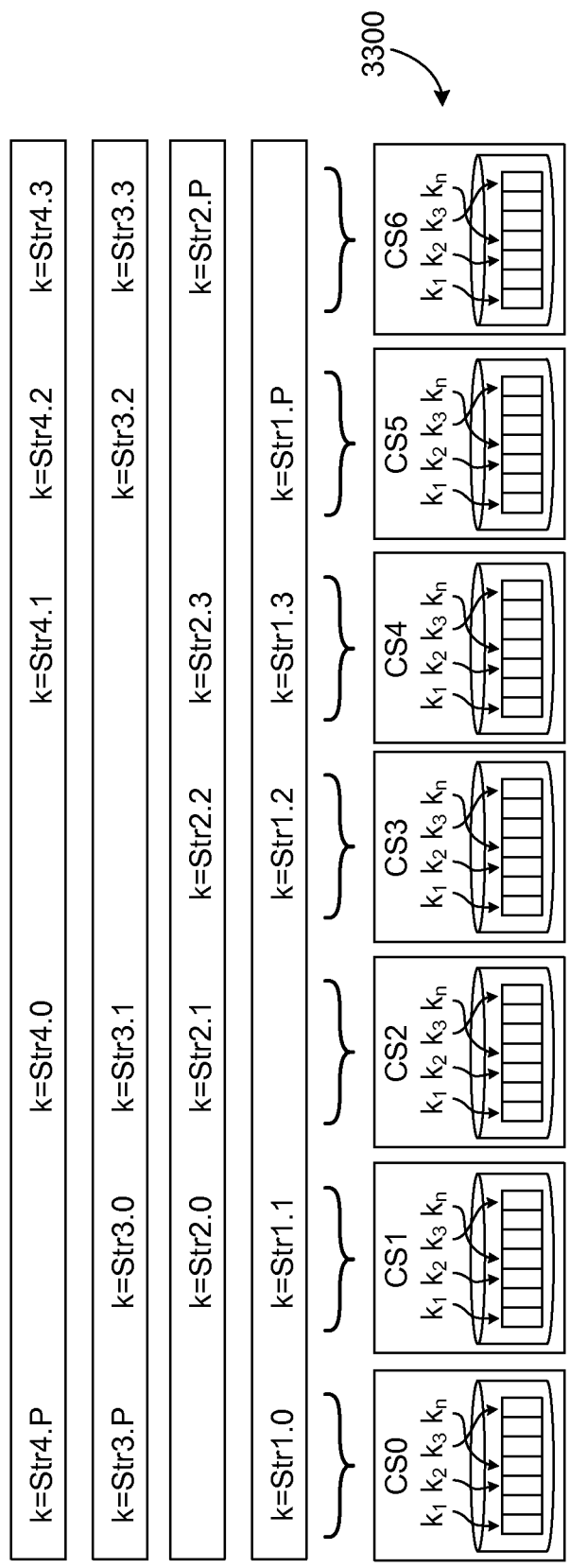
FIG. 3 illustrates how data containers are divided into chunks, how the data comprising each container is uniquely identified according to its writing entity, and how the chunks are separately stored in respective data storage devices.

FIG. 3 illustrates a very simple example of key-based striping for four stripes having a 4+1 RAID geometry (4 data chunks and 1 ECC chunk per stripe), and whose chunks are distributed over seven Chunk Stores CS0-CS6. For each chunk, its key k is shown as being of the form k=stem.suffix=StrX.Y, in which X indicates which stripe the chunk is part of, $Y \in \{0, 1, 2, 3\}$ indicates the position of the chunk within Stripe X and Y=P indicates that the chunk is an ECC chunk, such as a chunk containing parity bits. As mentioned above, both the stem and the suffix may in turn comprise sub-identifiers. Notice that, in this choice of layout, each CS stores three of the chunks, except for CS3, which is shown as currently storing only two.

Key structure will generally represent a choice between administrative complexity and computational ease: The more parameters that are included in the keys, the more information about the chunk, its origin and storage location the system will have readily available, but the more data will need to be stored for each key. The fewer parameters that are included, the more will need to be determined dynamically from other available information. It is therefore also possible to choose a simpler key structure. For example, it would be possible not to include the chunks' positional parameter (Y) in the key at all, but rather simply to derive the order of a chunk within a stripe from its position in the stripe. Given a 1 MB chunk size, for example, the first 1 MB in each stripe would be chunk number 1, the second 1 MB would be chunk number 2, and so on. This operation also works in reverse, to reconstruct a stripe from its constituent chunks: If a chunk is read in from the device known to be storing chunk number 3, for example, then the system will know that it is to be put in the third position in the stripe.

FIG. 3 illustrates another advantageous property: No two chunks of the same stripe are stored in the same disk, which means, of course, that failure of a given disk causes loss of only a single corresponding chunk for any stripe that's partially written to that disk, which in turn reduces the complexity needed for a sufficient corresponding ECC chunk. This is not a requirement for all implementations, however. For example, the decision may depend on which error correction method is chosen—suitably chosen ECC chunks may suffice to reconstruct missing chunks, rendering redundancy itself essentially redundant.

FIG. 3 also illustrates advantageous properties of preferred embodiments of the invention: the stripes are defined by the keys, not by physical identifiers such as logical block addresses (LBA); the chunks in a stripe have at least one identifier in common, such as a common key stem; the chunk key includes information, such as the suffix, that indicates its position in the stripe; and no other external record of the stripe is necessary. The advantageous consequences of these properties will become clearer below.

To organize the layout and CS assignment of chunks, the layout manager 3550 creates a data structure that stores a finite set of layout maps. Each layout map, or "layout" for short, has the form of an ordered list that indicates which Chunk Stores will be assigned to store their respective chunks in a stripe that is stored with this layout map. Each of the layout maps has its own unique MapID. The MapID is may be just the ordinal of each layout map in the set of layout maps.

In this disclosure, this data structure is referred to as the "layout table", shown in the figures as table 4000.

Each stripe in the pool is stored using one of the layout maps in the layout table. A function maps from the stripe key to a MapID. The MapID serves as the index into the layout table and so the layout map to use for a given stripe is determined from the stripe key and the layout table. No one layout map achieves a balanced load, but the set of layout maps is preferably chosen such that, taken together, the overall load that results from storing stripes with the set of layout maps is balanced.

The function that maps from stripe key to MapID could vary depending on what the system designer wants to prioritize. For example, the MapID could be a straightforward modulus of the stripe key, or a sub-set, or a randomization (such as a hash), etc. One advantage of some form of randomization is that it will in many cases reduce any tendency to load some Chunk Stores more than others, that is, it will tend to reduce biasing. A hash function of each stripe identifier will generally provide the desired randomization, although other functions may be used.

FIG. 4A illustrates a particular instance of the layout table 4000, which represents a policy for distributing chunks among the Chunk Stores. The illustrated table 4000 is an example of a balanced stripe map for seven disks (CS0-CS6) to store 3+1 RAID stripes, in which "P", as before, indicates an ECC parity chunk. Although the table 4000 is shown as being in the form of a two-dimensional table with "rows" and "columns", as is well know, the actual implementation of the table may be achieved using any of the many known data structures that enable the Stripe Manager 1220 to determine into which Chunk Store a given chunk of a specified stripe should be stored or is currently stored. For example, a one-dimensional array in which the MapID and CS number (or size-based offsets, such as the number of 1 MB data sub-sets) are used to compute offsets from a base address could implement the layout table illustrated in FIG. 4A. As used here, the term layout "table" is to be understood as meaning any data structure that performs the mapping functions described below, regardless of whether it is visualized as a two-dimension row-column "matrix", or transposed, as a linear list accessed via offset parameters, etc.

The first seven layout maps ("rows", with Map IDs 0-6) form a stripe map with a balanced reconstruction load: If the Stripe Manager selects the layout maps in equal proportions, and if any one Chunk Store fails, each remaining Chunk Store will contribute an equal number of chunks to the reconstruction effort. To achieve a uniform and balanced ECC load, the first seven layouts are repeated three times for a total of 28 layouts ("rows" 0-27) and in the repeat layout, the ECC chunk is rotated through each disk (CS). Such layout repetition thus enables this embodiment to achieve ECC load balance, but if this is not a design requirement then of course the number of layouts could be reduced, at least for that purpose.

The procedure to determine the initial arrangement of the layout table will depend on the design goals of a given implementation. In general, not only should the load distributions described previously be kept relatively uniform, data movement should also be minimized in the process. As an example, suppose that there are many layouts in the layout table (for example, 10,000) relative to the number of Chunk Stores (say, 100). Suppose also that 101st Chunk Store is added to the pool. A simple algorithm that at least maintains an almost uniform Disk Load across all 101 Chunk Stores, would be to substitute the new Chunk Store for a randomly selected existing Chunk Store in every 100th layout.

In the embodiment primarily shown in the figures and described here, the index (Map ID) into the layout table 4000 has been chosen to be a function of the key stem or key for the stripe. In particular, in this embodiment, $$\text{MapID} = \mathcal{H}(\text{stem})\%(R-1)$$

where "%" is "mod", that is, "modulo" and R is the number of layouts, in this example, 28. In short, in the embodiment illustrated in FIG. 4A, the layout map (table row) used to distribute the chunks of a stripe having a particular key stem is found in row MapID= $\mathcal{H}$ (stem) % 28.

For example, stripes having a MapID=2 will have their parity chunks stored in CS0, and their data chunks 1, 2, 3 stored in CS2, CS4 and CS6, respectively. CS1, CS3, and CS5 will not contain any data from the stripes having MapID=2. Similarly, for the layout of stripes with MapID=7, data chunks 1, 2, 3 and parity chunk P are stored in CS2, CS3, CS0 and CS1, respectively, which is the first of the three P-chunk rotations of the layout in row 0 (MapID=0). Layout 27 (MapID=27) is, similarly, the third and last rotation of layout 6.

FIG. 4B illustrates how a stripe having $\mathcal{H}$ (stem)=84 will have its four chunks P, 1, 2, 3 stored in CS0, CS1, CS2, CS3, respectively, since 84 mod 28=0, which means its chunks are distributed as in layout map with MapID=0 (Layout 0 for short). Similarly, the stripe having $\mathcal{H}$ (stem)=89 will have its four chunks P, 1, 2, 3 stored in CS1, CS3, CS4, CS6, respectively, since 89 mod 28=5, which means its chunks are distributed as in Layout 5.

Note that all that's required to access a given chunk of a given stripe will be the MapID, which is preferably derivable from the stripe key. For example, to find chunk 2 of a stripe with MapID=5 in the layout table shown in FIG. 4A, the stripe manager or DVA driver, or any of the nodes, may simply enter the table at row 5 (MapID=5) and see that the desired chunk is stored in CS4.

Using the layout table 4000, a finite set of layout maps is thus sufficient to enable a good distribution. By including a copy of the layout table 4000 within each host, for example, (see FIG. 2) or host-side stripe manager 1220 within the DVA driver 1210, there will be no need for extra messages from any kind of file system manager to access chunk storage, not even in case of a change of storage location. Rather, as long as the stripe manager updates the layout table, with changes propagated to hosts in any normal manner, then clients will be able to write and read chunks without knowing anything about the physical addresses where the chunks reside inside of the storage devices managed by the Chunk Stores.

The example Layout Table in FIGS. 4A and 4B represent one example of a layout policy, that is, the policy that determines in which Chunk Stores a given stripe will be distributed over. Other layout policies are of course also possible, and may be chosen depending on implementation needs. In other words, even for a (MapID, Chunk Stores) table, the actual chunk assignments for each layout may be chosen other than as shown, and will take into account such factors as how many Chunk Stores are available and their sizes, the number of chunks per stripe, the number of different layouts desired to improve, in any sense, the ability to achieve the different balancing and scalability goals, etc.

Note that, in most real-world implementations, there will be many more Chunk Stores than chunks in each stripe. There may also be many more stripes (even billions) than rows in the layout table. As described, the layout table 4000 may be compact even for such large numbers of possible stripe-CS assignments. One advantage of this is that it will require relatively little storage space, such that it will normally be easy to store in each client, even in its RAM or cache.

Layout Changes and Reconstruction

Figure 5A:
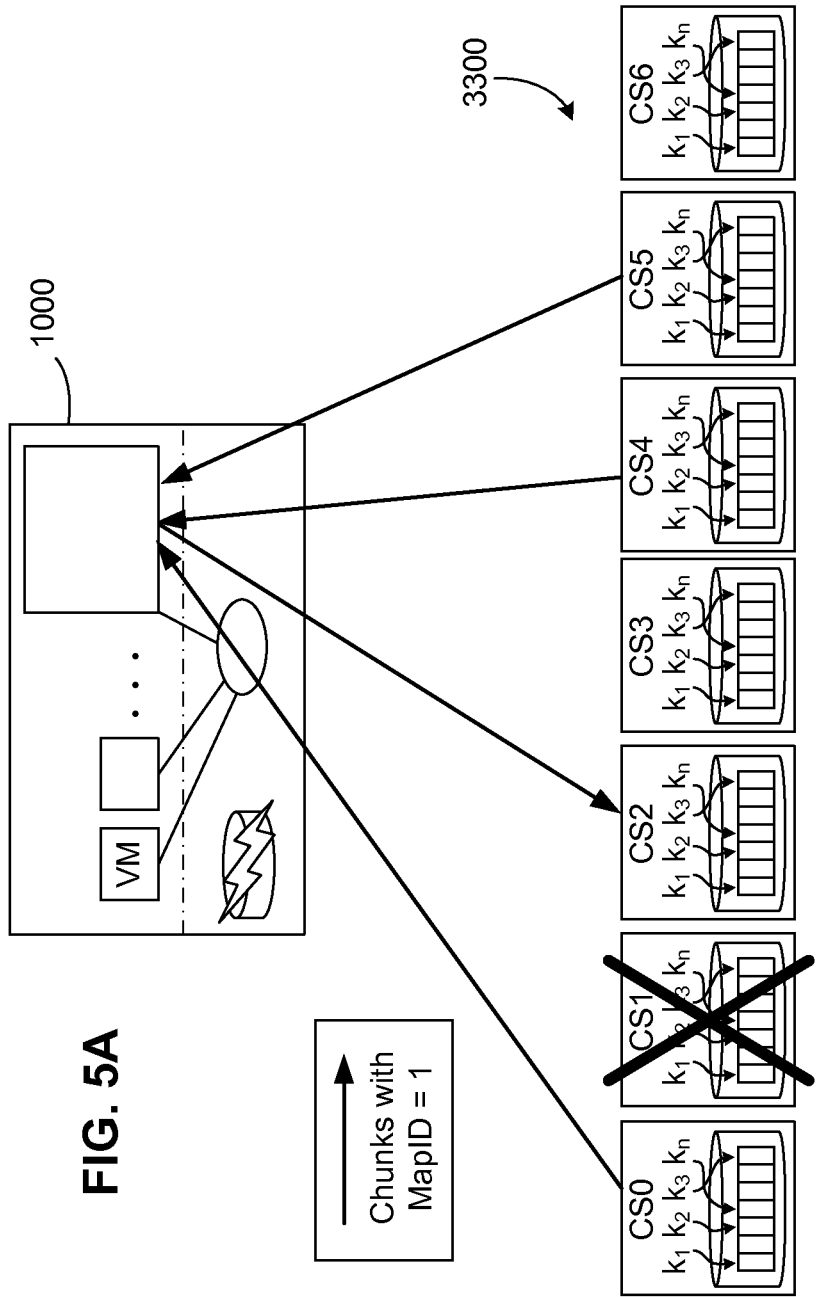

Now assume that Chunk Store 1 fails such that the chunks stored in it become inaccessible for reads or writes. This situation is illustrated in FIG. 5A. This can happen, for example, because the drive hardware fails, the server connection to the network is lost (permanently or temporarily), etc. In the example shown in FIG. 4A, this means that the stripes with MapIDs 0, 1, 4, 5, as well as their "repeats" (with MapIDs 0+7n, 4+7n, 5+7n, n=1 to 3) will not be able to access data chunk 1 (for MapID=0, 1) or the ECC chunks (for MapID=4, 5).

Note that the data comprising the "missing" chunk for a given stripe is not lost, at least not if the ECC chunk(s) are chosen properly. For example, using typical parity-based ECC, to reconstruct chunk 1 for MapID 2, the stripe manager(s) may perform an XOR (exclusive OR) operation on the data bits of stripe chunks P, 2 and 3 (read from CS0, CS4 and CS5, respectively, as illustrated in FIG. 5A) and thereby recreate the chunk 1 that had been stored in CS1. The question is then where to store the recreated chunk 1. Obviously, it cannot be rewritten to CS1 as long as it remains in a failed state.

FIGS. 5A, 5B, and 5C illustrate one example of a table reconstruction process. Again, assume that CS1 has failed, which means that the CS1 "column" of the table is "zeroed out". One example of a chunk storage reassignment policy, illustrated in FIGS. 5A-5C, is to write the reconstructed chunk data to the Chunk Store having the sequentially next highest "empty" CS. Returning to the pre-failure layout table shown in FIG. 4, for Layout 1 (MapID=1), the next highest empty CS relative to the failed CS1 is CS2. Accordingly, following this example reassignment policy, the data chunk 1 that was in CS1, after reconstruction, is written into CS2. The same policy is then applied to the other data chunks of CS1. For example, the chunks in CS1 for MapIDs 0, 4, and 5 (and their repeats) are moved to CS4, CS3, CS2, and CS4, respectively.

The "next higher empty CS" reassignment policy is simple to implement, but it may often lead to a less balanced distribution than desired. One alternative would be to randomly choose one CS from among the "empty" CSs, that is, those Chunk Stores not currently storing any other chunks from the same stripe, and write the reconstructed chunk to that CS.

Figure 6B:
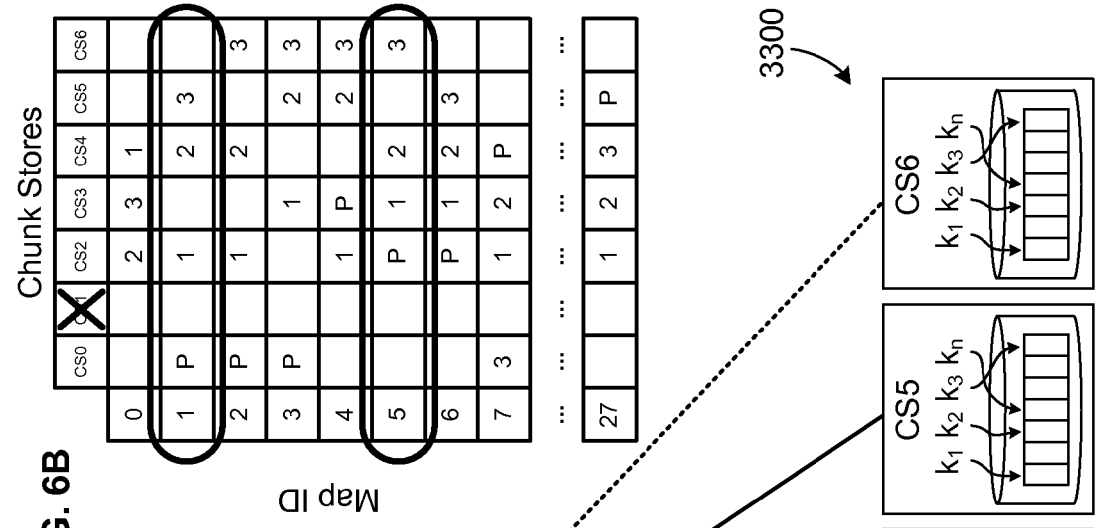
FIGS. 6A and 6B illustrate, within one host, concurrent reconstruction of chunks belonging to stripes with two different Map IDs.
Figure 6A:
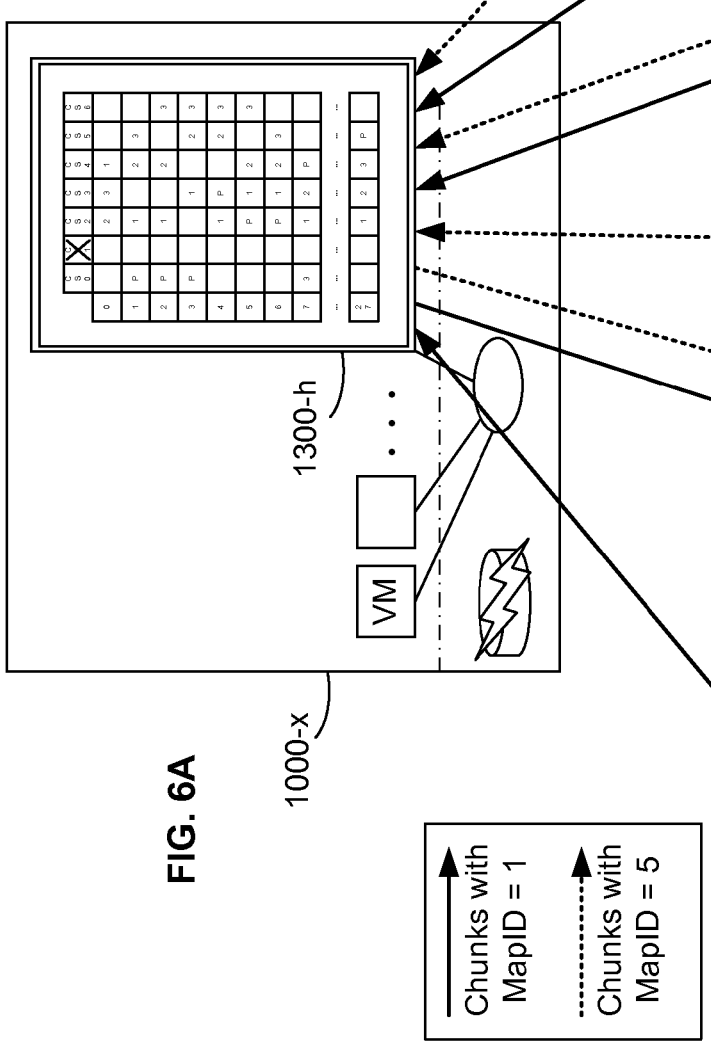

Chunk reassignment and updating of the layout table 4000 is advantageously handled by the layout manager 3550, which then communicates the new layout table to the clients. The clients, all of which will have a local copy of the same global table, can then start to read and write stripes with the new table. After the new layout table is generated, a process is needed to reconstruct the lost chunks and store them in the newly designated Chunk Stores. FIG. 6B shows a new layout table that includes two rows (Map IDs 1 and 5) which have the newly designated Chunk Store CS2. FIG. 6A shows the reconstruction process for stripes with these two Map IDs. For stripes with MapID=1, chunks are read from CS0, CS4, and CS5, the chunk that had been on CS1 is reconstructed and written to CS2. For stripes with MapID=5, chunks are read from CS3, CS4, and CS6 and the reconstructed chunk is written to CS2.

One other unique feature of the embodiment illustrated in FIGS. 6A and 6B is that, using the layout table 4000 and the chosen reassignment policy for chunks in a failed or unavailable Chunk Stores, the system may reassign chunks from more than one layout at the same time, with no risk of collision and no need for synchronization. FIG. 7 illustrates how embodiments of the layout table can be extended even further: In this example, multiple—indeed, in many cases, even all—hosts 1000-x, 1000-y, 1000-z may participate in chunk reconstruction concurrently, with no need for synchronization.

Recovery from a failed Chunk Store thus involves several steps. First, the layout manager 3550 identifies layouts that include the failed Chunk Store, as well as a replacement Chunk Store for the failed Chunk Store in each of those layouts. The layout manager 3550 then generates a new "target layout map" with needed reassignments indicated. The layout manager 3550 then propagates the new table to the clients.

Lastly, a background job is preferably started that finds all stripes written with those affected layouts (in the current layout map), reconstructs the missing chunks, and writes the chunks out using the new layouts. (One example of reconstruction of stripes affected by a Chunk Store failure is described beginning with the following paragraph.) This allows the target layout table to be established for all clients, and then the costlier (in terms of processing and network demand) task of reconstructing missing chunks and writing them to their respective, new assigned Chunk Stores may run as a background process. Once all chunks have been reconstructed and written to their new CSes, the target layout map may be used as the current or "active" layout map until yet another updating is required.

Data reconstruction is preferably carried out by code executing the required task within a client, such as in the helper process 1300-h (see FIG. 1) or within the DVA driver 1210. Note that client hosting of such reconstruction code is novel in and of itself: In prior art systems, consistency requires any new writes to be tightly coordinated with the reconstruction process because otherwise these writes might get erased with new data coming in; thus all such processes must be co-located and coordinated. In the illustrated embodiments, however, stripes are not updated once written, so it is permissible for other entities to carry out reconstruction.

Observe that keys can be sorted. Chunks can therefore also be sorted by keys, and not by their physical storage locations. Chunk Stores therefore preferably maintain an internal data structure indicating the order of their keys so that they can determine which chunk key is "next". Note that writing processes and the data-reconstructing task themselves do not need to know what the keys are, since only a Chunk Store will typically need to maintain the key-to-physical address mapping 3350. Nonetheless, given a stripe to be reconstructed the updated layout table 4000 will indicate in which Chunk Stores a given stripe's chunks are to be found.

Each task thus starts an iteration process (an "iterator") in which it iteratively requests from each of its four (in the illustrated examples) relevant Chunk Stores for the next chunk in sort order, which is determined by key. Once the iteration process begins, chunks will start arriving that belong to stripes written with the affected layouts. Because chunk iterators return chunks in sorted order, the buffering requirements on the receiving end should be reasonable since chunks belonging to the same stripe should arrive close to each other in time. The task reconstructs the missing chunk of each stripe from the remaining chunks, and writes them to the appropriate replacement Chunk Store. When all iterators and tasks complete, reconstruction is complete."

By way of example, note that all of the stripes with MapID=1, that is, Layout 1, will be written to the same set of Chunk Stores (CS0, CS1, CS4 and CS5, which, upon failure of CS1, will be updated to CS0, CS2, CS4 and CS5). Thus, CS4 and CS5 have corresponding chunks for all the stripes with MapID=1. (CS4 and C5 will also have chunks for stripes with other MapIDs.)

Now assume the illustrated case (FIG. 3) in which the chunk key has the format <stripe_key, chunk_number> and consider just the stripes for MapID= $\mathcal{H}$ (stripe_key) % 28=1, that is, the stripes that fall in Layout 1. Because CS4 and CS5 have corresponding chunks for the same stripe and these chunks are named with the stripe key, when they sort their chunk keys, they are effectively sorting by stripe keys. In other words, the sort order when sorting by stripe key is the same as the sort order of the chunks in the chunk stores. Thus, when the reconstruction process asks the two chunk stores for the "next" chunk with Layout 1, the two chunk stores will produce their corresponding chunk for the "next" stripe. The reconstruction task may then examine the keys for the chunks it has received from the two chunk stores and see that they belong to the same stripe, which then allows them to reconstruct the missing chunk.

There are different ways to ensure that the Chunk Stores return chunks with Layout 1 when requested to do so. One way is to associate metadata with each chunk such that when a client writes the chunk, it also sets the MapID metadata tag to 1. In this case, the reconstruction task asks for the next chunk that has metadata tag for MapID=1. The ChunkStores then filter out all the chunks that belong to stripes with other MapIDs.

Alternatively, the MapID may be made a field within the chunk keys themselves. For example, the chunk keys could have the form <MapID, stripe_key, chunk_number>. With the MapID in the most significant position in the chunk key, a sort of the chunk keys would result in all the chunks with the same MapID coming together. The reconstruction task could thereby ask CS4 and CS5 for the "next" chunk after the one with chunk key <1, 0, 0>—both would produce their chunk for whatever stripe with MapID=1 had the lowest sort order stripe key. The reconstruction task does not need to know what stripe that is, the Chunk Stores don't need to know that these chunks are part of a stripe, and no independent authority needs to have a record of what stripe that is. Nevertheless, the two chunk stores will produce corresponding chunks for the same stripe. In short, reconstruction of data sets (here, stripes) is made possible essentially "automatically", with no need for the administrative and computational overhead of extra data structures, by virtue of the sortable key structure used for chunk allocation as opposed to allocation according to physical addresses.

As mentioned above, one novel feature of at least one embodiment is that reconstruction of container data may be carried out by processes within the hosts/clients themselves. As FIG. 7 illustrates, different hosts may reconstruct different containers, for example, the respective containers they caused to be written in the first place, or the workload may be distributed according to other schemes. For example, which host reconstructs a particular container may be made at least in part a function of the layout of that container, with certain hosts assuming responsibility for reconstructing containers whose MapID values or key ranges indicate particular ones of the layouts affected by data inaccessibility. Allocation of reconstruction duties could similarly be made a function of the key used to identify each respective container to be reconstructed. As yet another alternative, metadata could also be used to determine which hosts reconstruct which containers. Thus, containers may be assigned to hosts at least in part by metadata associated with the container chunks. These alternatives allow multiple hosts to concurrently reconstruct disjoint subsets of the containers.

Hosts will generally not know what stripes have been written out to the Chunk Stores, since there may be many other "writers" and no coordination concerning any given write. The Chunk Stores themselves, however, will know what chunks they have, since each respective storage controller 3200 preferably maintains a map 3350 (see FIG. 2) mapping the keys to actual physical locations, for example, a mapping of the keys to respective physical block addresses PA. Because each CS implements this translation, no coordination is needed among writers as to what physical addresses will be used for stripes.

Several advantages of embodiments of the invention have already been mentioned above. An additional advantage is the scalability provided. One of the main limitations of traditional RAID is the fact that reconstruction of a failed disk is limited by the write throughput of the replacement disk. Though it uses RAID concepts, the Storage Pool is unlike traditional RAID in that it does not directly expose the addressing mechanisms of its underlying storage devices, thus giving it flexibility in how to store both new data, and reconstructed data. Because a stripe is addressed by key, and the physical locations of the chunks that make up the stripe are only indirectly referred to by the layout map, the Storage Pool is free to place and move data around as it sees fit. This flexibility enables simplicity of management and predictability of performance.

Some systems distribute data across storage devices according to an algorithm that does not include anything like a layout table. Often, in such systems, a change in configuration, such as the addition of a new storage device, can cause the assigned location of most, if not all, blocks, as determined by the layout algorithm, to change. This results in a very heavy load to migrate the large amount of data from its old assigned location to its new location. An advantage of the disclosed Storage Pool with the layout table is that single chunks in a subset of the layout maps can be updated to achieve a balanced load for the new configuration with a small amount of data movement.

Another advantage alluded to previously relates to performance: Data stored in the Storage Pool is accessed through keys that the storage clients are responsible for managing. Moreover, because all clients of the Storage Pool are full participants in the DVA system and procedures, they all follow a common convention that avoids collisions, rather than locking them out. This strategy obviates the need for distributed locking mechanism for writing, reading, or reconstruction of containers.

Yet another advantage is that the DVA system and operational method may eliminate the need for external metadata updates per container write or upon load rebalancing. Note also that, in the DVA, the more disks are included in the Storage Pool, the less each disk has to do, and the more hosts there are that need to access the Storage Pool, the more hosts will also be participating in reconstruction.

The invention claimed is:

1. A method for recovering data from a plurality of storage devices,
    said data being grouped as containers written by at least one writing entity within a corresponding one of a plurality of hosts, each container being identified by a unique key that is independent of physical storage identifiers and comprising a set of data chunks stored in different ones of the plurality of storage devices, said method comprising:
    detecting inaccessibility of one of the plurality of storage devices in which data chunks are stored;

iteratively requesting and receiving data chunks from the data storage devices in which a given container's chunks are stored;

for each container having a data chunk stored in the inaccessible storage device, reconstructing from the received data chunks belonging to the same container the corresponding data chunk that had been stored in the inaccessible storage device; and storing the reconstructed data chunk in a different one of the storage devices.

2. The method of claim 1, further comprising, in each of the storage devices, storing the respective data chunks in an order determined by the container key corresponding to each respective data chunk.

3. The method of claim 1, in which the step of iteratively requesting and receiving the data chunks comprises iteratively requesting and receiving the data chunks in storage key order.

4. The method of claim 1, further comprising:

storing the chunks of each container in the plurality of storage devices according to one of a plurality of layouts determined as a function of the container's key; and determining which of the received data chunks are stored according to the same layout and whether that layout specified storage of any data chunk of the corresponding container in the inaccessible storage device.

5. The method of claim 4, further comprising:

compiling the layouts into a layout data structure;

updating the layout data structure to reflect the inaccessibility of the storage device and to indicate, per layout, in which of the storage devices data chunks stored in the inaccessible storage are to be reconstructed; and distributing the updated layout table to the hosts.

6. The method of claim 4, further comprising associating with each chunk metadata indicating according to which layout the chunks of its corresponding container are stored in the storage devices.

7. The method of claim 6, in which the step of determining which of the received data chunks are stored according to the same layout comprises filtering the received data chunks according to their metadata.

8. The method of claim 4, further comprising including, in each key, information indicating according to which layout the corresponding container is stored.

9. The method of claim 1, in which the step of reconstructing the data chunks is carried out within a plurality of the hosts.

10. The method of claim 9, in which the step of determining the chunks stored according to the same layout is carried out within storage nodes that include the storage devices indicated by the respective layouts.

11. The method of claim 9, in which the determination of which host reconstructs a particular container is at least in part a function of the layout of the container.

12. The method of claim 9, in which the determination of which host reconstructs a particular container is at least in part a function of the key used to identify the container.

13. The method of claim 9, further comprising associating metadata with container chunks, such that the determination of which host reconstructs a particular container is a function of the metadata associated with the corresponding container chunks.

14. The method of claim 9, in which multiple hosts concurrently reconstruct disjoint subsets of the containers.

15. The method of claim 1, further comprising reconstructing the data chunks having been stored in the inaccessible storage device independent of any prior knowledge of which chunks belong to the same container.

16. A computer program product comprising code embodied in a non-transitory storage medium, said code being executable on at least one processor for causing the processor(s):

to recover data from a plurality of storage devices, said data being grouped as containers written by at least one writing entity within a corresponding one of a plurality of hosts, each container being identified by a unique key that is independent of physical storage identifiers and comprising a set of data chunks stored in different ones of the plurality of storage devices;

to detect inaccessibility of one of the plurality of storage devices in which data chunks are stored;

to iteratively request and receive data chunks from the data storage devices in which a given container's chunks are stored;

for each container having a data chunk stored in the inaccessible storage device, to reconstruct from the received data chunks belong to the same container the corresponding data chunk that had been stored in the inaccessible storage device; and to store the reconstructed data chunk in a different one of the storage devices.

17. The computer program product of claim 16, further including code causing the processor(s) to store, in each of the storage devices, the respective data chunks in an order determined by the container key corresponding to each respective data chunk.

18. The computer program product of claim 17, further including code causing the processor(s) iteratively request and receive the data chunks in storage key order.

19. The computer program product of claim 16, further including code causing the processor(s):

to store the chunks of each container in the plurality of storage devices according to one of a plurality of layouts determined as a function of the container's key; and to determine which of the received data chunks are stored according to the same layout and whether that layout specified storage of any data chunk of the corresponding container in the inaccessible storage device.

20. The computer program product of claim 16, said reconstructing of the data chunks being carried out by execution of corresponding code on at least one respective processor within the respective hosts.

21. The computer program product of claim 16, said reconstructing of the data chunks being carried out by execution of corresponding code within a plurality of the hosts.

22. The method of claim 21, in which the step of determining the chunks stored according to the same layout is carried out within storage nodes that include the storage devices indicated by the respective layouts.

23. The method of claim 21, in which the determination of which host reconstructs a particular container is at least in part a function of the layout of the container.

24. The method of claim 21, in which the determination of which host reconstructs a particular container is at least in part a function of the key used to identify the container.

25. The method of claim 21, further comprising associating metadata with container chunks, such that the determination of which host reconstructs a particular container is a function of the metadata associated with the corresponding container chunks.

26. The method of claim 21, in which multiple hosts concurrently reconstruct disjoint subsets of the containers.

27. The computer program product of claim 19, further including code causing the processor(s):
to compile the layouts into a layout data structure;
to updating the layout data structure to reflect the inaccessibility of the storage device and to indicate, per layout, in which of the storage devices data chunks stored in the inaccessible storage are to be reconstructed; and
to distributing the updated layout table to the hosts.

28. The computer program product of claim 16, further including code causing the processor(s) to reconstruct the data chunks having been stored in the inaccessible storage device independent of any prior knowledge of which chunks belong to the same container.

29. The computer program product of claim 19, further including code causing the processor(s) to associate with each chunk metadata indicating according to which layout the chunks of its corresponding container are stored in the storage devices.

30. The computer program product of claim 29, further including code causing the processor(s) to filter the received data chunks according to their metadata.

31. The computer program product of claim 19, further including code causing the processor(s) to include, in each key, information indicating according to which layout the corresponding container is stored.

32. A method for recovering data from a plurality of storage devices,
said data being grouped as containers written by at least one writing entity within a corresponding one of a plurality of hosts, each container being identified by a unique key that is independent of physical storage identifiers and comprising a set of data chunks stored in different ones of the plurality of storage devices, said method comprising:
storing the chunks of each container in the plurality of storage devices according to one of a plurality of layouts determined as a function of the container's key;
compiling the layouts into a layout data structure;
in each of the storage devices, storing the respective data chunks in an order determined by the container key corresponding to each respective data chunk, each said key including information indicating according to which layout the corresponding container is stored;
detecting inaccessibility of one of the plurality of storage devices in which data chunks are stored;
iteratively requesting and receiving, in storage key order, data chunks from the data storage devices in which a given container's chunks are stored;
for each container having a data chunk stored in the inaccessible storage device, determining which of the received data chunks are stored according to the same layout and whether that layout specified storage of any data chunk of the corresponding container in the inaccessible storage device and, independent of any prior knowledge of which chunks belong to the same container, reconstructing from the received data chunks belonging to the same container the corresponding data chunk that had been stored in the inaccessible storage device; and
storing the reconstructed data chunk in a different one of the storage devices;
updating the layout data structure to reflect the inaccessibility of the storage device and to indicate, per layout, in which of the storage devices data chunks stored in the inaccessible storage are to be reconstructed; and
distributing the updated layout table to the hosts.

\* \* \* \* \*